United States Patent
Bargo et al.

[11] Patent Number: 5,883,020
[45] Date of Patent: *Mar. 16, 1999

[54] FIBERGLASS INSULATION PRODUCT AND PROCESS FOR MAKING

[75] Inventors: Matthew Bargo, Corbin, Ky.; Edward Koperdak, Kalamazoo, Mich.

[73] Assignee: C.T.A. Acoustics, Corbin, Ky.

[*] Notice: This patent issued on a continued prosecution application filed under 37 CFR 1.53(d), and is subject to the twenty year patent term provisions of 35 U.S.C. 154(a)(2).

[21] Appl. No.: 675,084

[22] Filed: Jul. 3, 1996

Related U.S. Application Data

[60] Provisional application No. 60/000,875 Jul. 6, 1995.

[51] Int. Cl.$^6$ .................................................. D04H 1/60
[52] U.S. Cl. ......................... 442/168; 442/180; 442/174; 442/176; 442/175
[58] Field of Search ...................... 524/847, 876, 524/877; 264/109, 128; 442/168, 176, 180, 174, 175; 428/426, 435, 436, 415, 475.5, 477.4, 477.7

[56] References Cited

U.S. PATENT DOCUMENTS

| | | | |
|---|---|---|---|
| 2,662,044 | 12/1953 | Morrison et al. | 154/52 |
| 2,695,855 | 11/1954 | Stephens | 154/54 |
| 2,948,950 | 8/1960 | Finger et al. | 28/80 |
| 3,396,070 | 8/1968 | Gambill et al. | 161/119 |
| 4,751,134 | 6/1988 | Chenoweth et al. | 428/284 |
| 4,840,832 | 6/1989 | Weinle et al. | 428/156 |
| 4,888,235 | 12/1989 | Chenoweth et al. | 428/283 |
| 4,889,764 | 12/1989 | Chenoweth et al. | 428/283 |
| 5,093,962 | 3/1992 | Farrington et al. | 19/296 |
| 5,112,663 | 5/1992 | Morenz et al. | 428/71 |
| 5,494,628 | 2/1996 | Beyer et al. | 264/125 |
| 5,578,357 | 11/1996 | Fink | 428/95 |
| 5,626,939 | 5/1997 | Kotlair et al. | 428/97 |
| 5,662,994 | 9/1997 | Funger et al. | 442/413 |

FOREIGN PATENT DOCUMENTS

| | | |
|---|---|---|
| 60-206868 | 10/1985 | Japan . |
| 5-272041 | 10/1993 | Japan . |

OTHER PUBLICATIONS

F. Rodriquez, *Principle of Polymer Systems*, 2nd Ed., Table A5.2, entry for Nylon, pp. 538–539, 1982.

"Reuse of Carpet Industrial Waste for Concrete Reinforcement," by Y. Wang: RILEM Proc. (1995), 27, pp. 297–306. (abstract only).

"Material Recycling of Textile Flooring," by D. Wuestenberg and S. Schnell; Gummi, Gasern, Kunstat. (1993), 46(12), pp. 608,610–611. (abstract only).

PROMT database abstract of Plastics Technology (Apr. 1993) p. 22.

PROMT database abstract of Plastics News (22 Sep. 1997) p. 22.

*Primary Examiner*—Marion McCamish
*Assistant Examiner*—Cheryl Juska
*Attorney, Agent, or Firm*—Middleton & Reutlinger; Charles G. Lamb

[57] ABSTRACT

A thermal and acoustical insulation product prepared from a mixture of fiberglass, scrap nylon of less than 0.25" in length and a thermo-setting resin. The insulation product is in a ductliner or molded form. The fiberglass will generally be in a concentration of from 20 to 80 percent by weight of the product; the nylon will be from 1 to 30 percent by weight of the product; and the thermo-setting resin will be from 5 to 35 percent by weight of the product.

17 Claims, 1 Drawing Sheet

FIBERGLASS INSULATION PRODUCT AND PROCESS FOR MAKING

BACKGROUND OF THE INVENTION

The present patent application claims benefit of the provisional application 60/000,895 filed on Jul. 6, 1995.

The present invention relates to an insulation product and more specifically to an insulation product comprising fiberglass, scrap nylon, and a thermo-setting resin.

The use of fiberglass in the manufacturing of acoustical and insulation products is well known. Moreover, insulation materials comprised of fiberglass and organic fibers, including cotton, as well as synthetic or man-made fibers, formed into mats and utilizing a thermo-setting resin have been utilized for many years in the manufacturing of insulation and acoustical products. For example, U.S. Pat. No. 2,689,199 teaches the use of thermoplastic polymers and refractory fibers of glass in the manufacturer of a non-woven porous flexible fabric and U.S. Pat. No. 2,695,855 teaches the use of cotton, rayon, nylon or glass fibers with an appropriate resin for a thermal or acoustical insulation material. And, U.S. Pat. No. 4,888,235 teaches a non-woven fibrous product comprising a blended matrix of glass fibers and synthetic fibers having a conductive material of powdered aluminum, copper or carbon black and a thermo-setting resin dispersed in the matrix. However, a number of these insulation products which contain glass fibers and synthetic fibers are generally brittle and are easily broken or cracked when subjected to excessive flexing during installation or use. Moreover, in the processing of short length synthetic fibers, those less than ¼" in length, a number of processing problems have been encountered. One particular problem is spillage and loss of fiber material during transferring operations of blends of these short length synthetic fibers with fiberglass. In transferring from one conveying system to another there is a high percentage of spillage of the short synthetic fibers from the blend.

SUMMARY OF THE INVENTION

It is an object of the present invention to provide an improved thermal and acoustical insulation product comprising fiberglass, nylon and a thermal-setting resin.

It is a further object of the present invention to provide an insulation product with improved flexibility and a wide range of uses.

It is also an object of the present invention to provide a relatively inexpensive insulation product using recycled raw materials that are economical in cost to produce.

It is even a further object of the present invention to incorporate a relatively short synthetic organic fiber of less than 0.25" in an insulation product.

It is another object of the present invention to use a relatively small-sized synthetic fibrous material as a co-binder in an insulation product.

More particularly, the product of the present invention comprises fiberized glass fibers, nylon and a thermo-setting resin. The fiberized glass fibers will have a diameter of from 5 to 20 microns, preferably from 5 to 12 microns, a length of from 0.25" to 5.00", preferably from 3.00" to 5.00" and will be from 20 to 80% by weight of the final product. The nylon will be scrap, preferably from carpet scrap having a backing including ethyl vinyl acetate, polyvinyl chloride, or polypropylene, or mixtures thereof in filament form wherein the filaments are from 13 to 1,300 denier, preferably from 13 to 300 denier, less than 0.25" in length, less then 0.1875" in diameter, and the nylon will be from 1 to 30% by weight of the final product. The nylon being less than 0.25" in length and less than 0.1875" in diameter is in a powder-like form with a relatively high surface area and acts as both a fiber and a co-binder in a final product. The thermo-setting resins used in the present invention include the phenolic resins, particularly phenol-formaldehyde and more particularly, a powder phenolic resin and the amount of the thermo-setting resin will be from 5 to 35% by weight of the finished product. Other thermo-setting resins that may be used include, for example, epoxy resins, vinyl esters, urethane silicones, and other cross-linkable rubber and plastic polymers and resins, and the like. These resins may be in powder, latex, oil base or solvent base form; or, they may be "liquid" polymers. The finished product may be in molded or ductliner mat form and will generally have a density of from 0.75 to 40 lbs/ft$^2$. When the insulation is in ductliner mat form, the fiberglass is from 60 to 80% by weight, the nylon is from 5 to 25% by weight and the thermo-setting resin is from 10 to 25% by weight.

Further objects and advantages of the present invention will become apparent to those skilled in the art upon reference to the following description of the preferred embodiment.

BRIEF DESCRIPTION OF THE DRAWINGS

The FIGURE is a schematic diagram of a process manufacturing flow sheet of the insulation product of the present invention.

DETAILED DESCRIPTION OF THE PREFERRED EMBODIMENT

Figure 1:
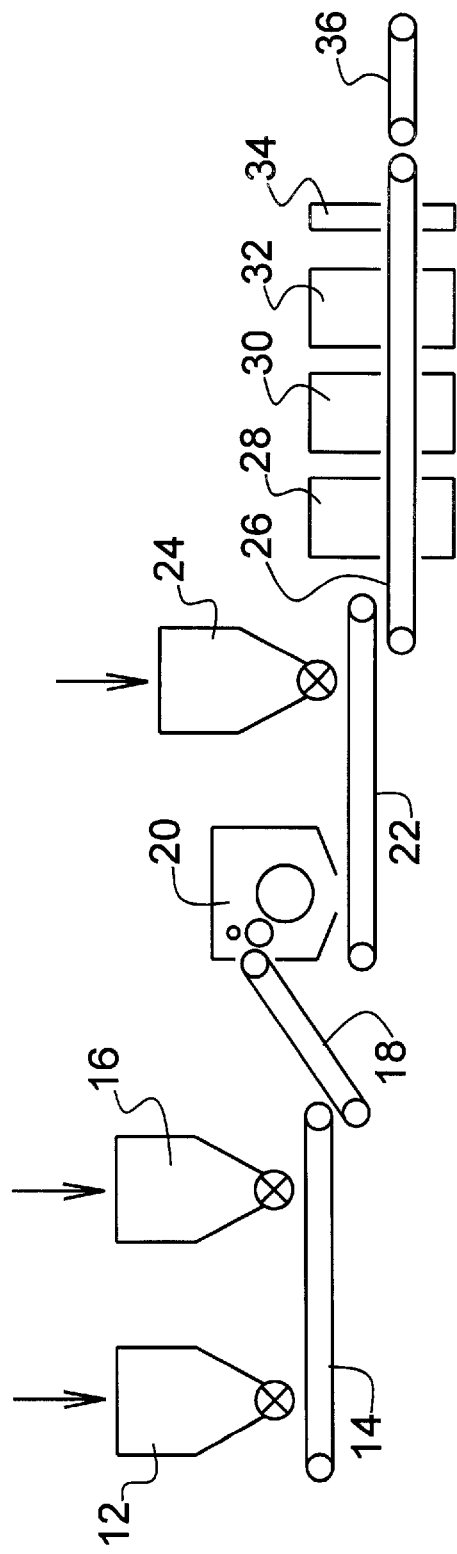

In the manufacture of ductliner and molded thermal and acoustical insulation in accordance with the present invention as shown schematically in the FIGURE, fiberglass fibers, preferably from 3" to 5" in length and 5 to 12 microns in diameter, are fed at a rate of generally about 250 to 1000 pounds per hour from a storage bin 12 to a blending conveyor 14, which may be an endless belt conveyor. The fiberglass may be fed directly from bin 12 onto conveyor 14 or other intermediate conveying means between bin 12 and conveyor 14 may also be utilized. Scrap nylon having a diameter less than 0.1875" in diameter, being less than 0.25" in length and being preferably of from 13 to 300 diener is fed to blending conveyor 14 from storage bin 16, which is downstream from the feed location of the fiberglass. The scrap nylon is usually carpet scrap with a backing of ethyl vinyl acetate, polyvinyl chloride, or polypropylene or mixtures thereof and is fed at a rate of generally about 12 to 370 pounds per hour. The mixture or blend of fiberglass and nylon proceeds along the blend conveyor 14 to a mixing-picker apparatus 20 which mixes the fiberglass and nylon and spreads the fibers, particularly the fiberglass fibers, apart for receipt of a thermo-setting resin, to be discussed hereinafter. The mixing-picker apparatus 20 that mixes and separates the fibers may be an open picker, for example, which has evenly spaced tooth bars on a rotating assembly. Many devices or apparatuses are known in the art for separating or spreading apart the filaments in a fiber, and blending different fibers, such as fiberglass and nylon together for an evenly distributed mix of the ingredients, and therefore such apparatus will not be described further.

The thoroughly mixed fiberglass and nylon with the fiberglass fibers being spread apart are then conveyed by conveyor 22 to receive a thermo-setting resin from storage bin 24, wherein a thermo-setting resin is fed uniformly at a rate of from about 65 to 435 pounds per hour to the blended fiberglass-nylon mix passing therebeneath. The conveyor 22 passing beneath the feeding apparatus from bin 24 may include means, such as spiked teeth thereon, to uniformly mix and distribute the thermo-setting resin throughout the fiberglass-nylon mix. Other mixing and processing means (not shown) may be provided to facilitate a uniform and thorough mix of the thermo-setting resin with the fiberglass-nylon mix, such as a high speed cylindrical roller that is clothed with a hardened steel saw tooth wire which opens the fibers further and does a further mixing of the binder with the fibers.

The binder impregnated fiber is then transferred onto another conveyor 26 which passes through a mat forming chamber 28 where the fiberglass-nylon-resin mix is formed into a mat. In the chamber 28, a vacuum is generally pulled on the bottom of the conveyor, thereby pulling the fibrous materials against the conveyor 26 to form a fibrous mat of a uniform uncured fiber-binder complex. The uncured fiber-binder complex mix is generally from about 5 to 50% by weight binder, from about 1 to 30% by weight nylon and from 20 to 80% by weight fiberglass.

From the mat forming chamber 28 the uncured fiber-binder mat is transferred by conveyor 26 into a curing oven 30 wherein the uncured fiber binder mat is subjected to sufficient heat to at least cure and set a desired proportion of the thermo-setting resin. In the production of a cured duct-liner using a phenolic resin binder, the temperature of the oven will range from 400° F. to 600° F., depending upon the thickness and gram weight of the mat being produced. And, the mat is subjected to these temperatures for a period of time sufficient to set the phenolic resin binder, which is from about 1 to 4 minutes. In the production of a semi-cured mat to be further subjected to a molding operation, the temperature of the oven will range from 200° F. to 300° F. for from 1 to 3 minutes so that the phenolic resin is only partially set.

The product leaving the curing oven 30 passes through a cooling chamber 32 and then through a slitter 34 where the slitter slits the mat into sections of a selected width and length. The mats are then transferred by conveyor 36 to storage for further use, such as a molding operation, or wound on a batt winder (not shown) for use as an insulation product.

In the mold operation the mat will be completely cured and set into a desired shape and thickness. Any type of mold known in the art may be used, such as rotary molds, double shuttle molds, non-shuttle molds and roll loader molds. Each of the molds is generally driven by either hydraulic or air cylinders which generate between 2 and 6 psi of molding pressure. Depending upon the thickness and density of the mat to be molded, the cycle times will vary from 45 to 150 seconds with the mold temperatures being 375° F. to 450° F. The finished molded product will generally be from 0.125" to 3" thick. The molded products are then ready for use and may be cut by any well known means to a preselected size and shape.

The following Examples illustrate a number of products made in accordance with the practice of this invention. These Examples are provided by way of illustration only and are not intended to limit the scope of this invention in any manner.

EXAMPLE I

One product made in accordance with the process set forth in the Detailed Description of the Preferred Embodiment is a molded product 1" in thickness. The product is comprised of 60% fiberglass, 20% scrap nylon from carpet scraps including ethyl acetate, polyvinyl chloride and polypropylene, and 20% phenolic-formaldehyde thermo-setting resin. This product has a density of 2.5 pounds per cubic foot with a noise reduction co-efficient of 0.35 ASTM-E1050 and a K-Value (thermal conductivity) of 0.267 (ASTM-C581). The tensile strength is 31 pounds per square inch. And, upon being subjected to a pressure of 50 pounds per square inch, the mat compresses 43.4 per cent and has a recovery of 95.9 per cent.

The molded product meets the typical requirements of automotive manufacturers and is therefore acceptable for use as an engine compartment sound absorber.

EXAMPLES II–IV

These Examples are products made in accordance with the process set forth in the Detailed Description of the Preferred Embodiment. In each example, the density was changed by altering the rates of flow of the materials through the process. All of the products contained 60% fiberglass, 20% scrap nylon from carpet scraps, and 20% phenolic-formeldehyde thermo-setting resin.

|  | DENSITY LBS/ CU.FT. | NOISE REDUCTION COEFFICIENT ASTM E1050 | THERMAL CONDUCTIVITY ASTM C581 K-VALUE | TENSILE STRENGTH, LBS./SQ.IN. |
| --- | --- | --- | --- | --- |
| Example II | 1.5 | 0.3 | 0.31 | 20 |
| Example III | 2.0 | 0.45 | 0.26 | 30 |
| Example IV | 3.0 | 0.6 | 0.24 | 50 |

All of the products meet the requirements of automotive manufacturers for use as engine compartment sound absorbers.

Even though only one preferred embodiment has been shown and described, it is apparent that products incorporating modifications and variations of the preferred embodiment will become obvious to those skilled in the art and therefore the described preferred embodiment should not be construed to be limited thereby.

What is claimed is:

1. A thermal and acoustical insulation product, wherein said insulation product is a molded insulation product comprising fiberglass, a thermo-setting resin, and a co-binder, said co-binder being scrap nylon, said scrap nylon being less than 0.25" in length.

2. The insulation product of claim 1, said fiberglass being 20 to 80% by weight, said nylon being from 1 to 30% by weight, said thermo-setting resin being from 5 to 35% by weight.

3. The insulation product of claim 1, said scrap nylon being carpet scrap.

4. The insulation product of claim 3, said carpet scrap including ethyl vinyl acetate, polyvinyl chloride, or polypropylene, or mixtures thereof.

5. The insulation product of claim 1 wherein said thermo-setting resin is a phenolic resin.

6. The insulation product of claim 5 wherein said phenolic resin is a phenolic-formaldehyde resin.

7. The insulation product of claim 1, said thermo-setting resin including epoxy resins, vinyl esters, urethane silicones, or mixtures thereof.

8. The insulation product of claim 1 wherein said fiberglass fibers are from 0.250" to 5" in length and from 5 to 20 microns in diameter.

9. The insulation product of claim 1 wherein said nylon in fibrous form is less than 0.1875" in diameter and from 13 to 300 deniers.

10. A thermal and insulation product, wherein said insulation product is a ductliner comprising fiberglass, a thermo-setting resin, and a co-binder, said co-binder being scrap nylon less than 0.25" in length, the fiberglass being from 60 to 80% by weight, the nylon being from 5 to 25% by weight and the thermo-setting resin being from 10 to 25% by weight.

11. The insulation product of claim 10, said scrap nylon being carpet scrap.

12. The insulation product of claim 11, said carpet scrap including ethyl vinyl acetate, polyvinyl chloride, or polypropylene, or mixtures thereof.

13. The insulation product of claim 10 wherein said thermo-setting resin is a phenolic resin.

14. The insulation product of claim 13 wherein said phenolic resin is a phenolic-formaldehyde resin.

15. The insulation product of claim 10, said thermo-setting resin including epoxy resins, vinyl esters, urethane silicones, or mixtures thereof.

16. The insulation product of claim 10 wherein said fiberglass fibers are from 0.250" to 5" in length and from 5 to 20 microns in diameter.

17. The insulation product of claim 10 wherein said nylon in fibrous form is less than 0.1875" in diameter and from 13 to 300 deniers.

* * * * *